United States Patent [19]

Matsuzawa et al.

[11] Patent Number: 6,141,455
[45] Date of Patent: *Oct. 31, 2000

[54] IMAGE ENCODING APPARATUS EMPLOYING ANALOG PROCESSING SYSTEM

[75] Inventors: Akira Matsuzawa, Kyoto; Shoji Kawahito; Yoshiaki Tadokoro, both of Aichi, all of Japan

[73] Assignee: Matsushita Electric Industrial Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/942,917

[22] Filed: Oct. 2, 1997

[30] Foreign Application Priority Data

Oct. 9, 1996 [JP] Japan .................................. 8-268561

[51] Int. Cl.$^7$ ...................................................... G06T 9/00
[52] U.S. Cl. .................................................... 382/250
[58] Field of Search ...................................... 382/250, 248; 358/432, 433; 348/395, 403, 404; 364/826

[56] References Cited

U.S. PATENT DOCUMENTS

| | | | |
|---|---|---|---|
| 4,152,772 | 5/1979 | Speiser et al. | 364/725 |
| 4,156,923 | 5/1979 | Lampe et al. | 364/844 |
| 4,161,785 | 7/1979 | Gasparek | 364/827 |
| 4,878,754 | 11/1989 | Homma et al. | 356/376 |
| 5,396,291 | 3/1995 | Sanpei | 348/405 |
| 5,862,070 | 1/1999 | Shou et al. | 364/826 |

FOREIGN PATENT DOCUMENTS

| | | | |
|---|---|---|---|
| 51-83714 | 7/1976 | Japan | H04B 1/66 |
| 52-045817 | 4/1977 | Japan | H04N 5/76 |
| 52-045818 | 4/1977 | Japan | H04N 5/76 |
| 07095414 | 4/1995 | Japan . | |
| 07095414 | 7/1995 | Japan | G06F 7/52 |

| | | |
|---|---|---|
| 0 550 012 | 7/1993 | United Kingdom . |

OTHER PUBLICATIONS

A.M. Chiang, et al., "A 100ns 16–Point CCD Cosine Transform Processor", ISSCC Digest of Technical Papers, pp. 306–307, Feb. 1987.

XP–000753063 –ISSCC97/ SESSION 11 IMAGING CIRCUITS AND SYSTEMS / PAPER FA 11.3 –Shoji Kawahito, Makoto Yoshida Masaaki Sasaki, Keijiro Umehara, Yoshiaki Tadokoro, Kenji Murata, Shirou Doushou, Akira Matsuzawa –pp. 184 & 185.

A 128 x 128 CMOS Active Pixel Image Sensor for Highly Integrated Imaging Systems –Sunetra K. Mendis, Sabrina E. Kemeny and Eric R. Fossum –pp. 583–586.

Random addressable CMOS image sensor for industrial applications –Nico Ricquier, Bart Dierickx Received Jun. 16, 1993; in revised form Jan. 13, 1994; accepted Jan. 25, 1994 –pp. 29 –35.

*Primary Examiner*—Joseph Mancuso
*Assistant Examiner*—Paul H. Schirduan
*Attorney, Agent, or Firm*—McDermott, Will & Emery

[57] ABSTRACT

An image sensing element for providing a series of voltage signals corresponding to a two-dimensional image, a two-dimensional analog DCT (discrete cosine transform) circuit for performing a two-dimensional DCT on the voltage signal series from the image sensing element in pixel blocks, and a quantization circuit for quantizing a result of the DCT are provided. The two-dimensional analog DCT circuit is formed of a row of analog sum-of-products arithmetic units for one-dimensional DCT and an analog memory array for matrix transposition. The quantization circuit converts a voltage representing a result of the DCT carried out by the two-dimensional analog DCT circuit into a digital value according to a given quantization coefficient $Q=2^N \cdot S$ ($1 \leq S < 2$) wherein a voltage $S \cdot Vref$ that is S times greater than a fixed voltage Vref serves as a reference voltage, and performs a process of right-shifting the digital value N bits in order to provide a quantized digital value.

10 Claims, 10 Drawing Sheets

Fig. 3

$$\begin{bmatrix} Hj(0) \\ Hj(1) \\ Hj(2) \\ Hj(3) \\ Hj(4) \\ Hj(5) \\ Hj(6) \\ Hj(7) \end{bmatrix} = \frac{1}{4} \begin{bmatrix} d & d & d & d & d & d & d & d \\ a & c & e & g & -g & -e & -c & -a \\ b & f & -f & -b & -b & -f & f & b \\ c & -g & -a & -e & e & a & g & -c \\ d & -d & -d & d & d & -d & -d & d \\ e & -a & g & c & -c & -g & a & -e \\ f & -b & b & -f & -f & b & -b & f \\ g & -e & c & -a & a & -c & e & -g \end{bmatrix} \begin{bmatrix} h(0,j) \\ h(1,j) \\ h(2,j) \\ h(3,j) \\ h(4,j) \\ h(5,j) \\ h(6,j) \\ h(7,j) \end{bmatrix}$$

IMAGE ENCODING APPARATUS EMPLOYING ANALOG PROCESSING SYSTEM

BACKGROUND OF THE INVENTION

This invention relates to an image encoding apparatus for compression of information of images.

Various image encoding apparatus by means of discrete cosine transform (DCT) have been known in the art. Conventionally, an image encoding apparatus includes a two-dimensional digital DCT circuit and a quantization circuit formed by a digital division operation unit and employs digital processing technology. A series of analog signals from an image sensing element such as a CCD (charged-coupled device) is converted by an ADC (analog-to-digital converter) into a series of digital signals. The digital signal series is temporarily held in an image memory. In the two-dimensional digital DCT circuit a two-dimensional DCT is performed on the digital signal series applied from the image memory in pixel blocks. In order to quantize a result of the two-dimensional DCT performed by the two-dimensional digital DCT circuit, the quantization circuit carries out a division operation of dividing a digital value representing the transform result by a quantization coefficient Q.

However, a disadvantage of the above-described image encoding apparatus is that both the two-dimensional digital DCT circuit and the quantization circuit, formed of a digital division operation unit, are large in circuit scale. This means that there is still room for improvement of the conventional image encoding apparatus, to provide, a compact, low-power, and low-cost image encoding apparatus.

SUMMARY OF THE INVENTION

Accordingly, it is an object of the present invention to provide an improved image encoding apparatus employing an analog processing technique which is attractive for the realization of a reduction in circuit size, a reduction in power consumption, and a reduction in product cost.

In order to achieve the object, the present invention employs an organization that is formed of an image sensing element for providing a series of voltage signals corresponding to a two-dimensional image, a two-dimensional analog DCT circuit for performing, in pixel blocks, a two-dimensional DCT on a series of voltage signals applied from the image sensing element, and a quantization circuit for quantizing a result of the two-dimensional DCT performed by the two-dimensional analog DCT circuit. The two-dimensional analog DCT circuit has a row of analog sum-of-products arithmetic units for performing a one-dimensional DCT, and an analog memory array for holding a series of output voltage signals of the analog sum-of-products arithmetic unit row corresponding to a series of voltage signals from the image sensing element and for applying a series of voltage signals obtained by transposing a matrix formed of the output voltage signal series to the analog sum-of-products arithmetic unit row. According to Equation (1), shown below, and using a voltage S·Vref as a reference voltage which is S times greater than a fixed voltage Vref, the quantization circuit converts a voltage which is a representation of a transform result of the two-dimensional analog DCT circuit, into a digital value.

$$Q=2^N \cdot S, \text{ with } 1 \leq S < 2 \quad (1)$$

In the quantization circuit the digital value is shifted N bits to the right. The quantization circuit is formed of an ADC circuit for converting a voltage representing a transform result of the two-dimensional analog DCT circuit into to a digital value, a decoder for generating signals N and S which satisfy Equation (1) from the quantization coefficient Q, a DAC (digital-to-analog converter) for applying the reference voltage S·Vref (Vref=fixed voltage) corresponding to the signal S to the ADC circuit, and a shifter for performing a process of right-shifting the digital value, obtained in the ADC circuit, N bits corresponding to the signal N.

Generally, signals, converted from spatial components to frequency components by two-dimensional DCT, are ones in which electric power is concentrated in low frequency ranges. Further, the human vision system is less sensitive to the higher frequency components of an image than to the lower frequency components. This characteristic of the human vision system is utilized. That is, lower frequency components are quantized with a higher precision while on the other hand higher frequency components are quantized with a lower precision, to perform compression of image information. Additionally, it is required that the quantization coefficient Q is made variable according to the degree of DCT and the rate of data required in order that adaptive quantization may be carried out.

Here, the voltage that represents a transform result of the two-dimensional analog DCT circuit is Z. If division by the quantization coefficient Q is performed at the same time that the voltage Z is converted into a digital value R of n bits using the reference voltage Vref, then Equation (2) is obtained.

$$R=[(Z/Q)/(Vref/2^n)] \quad (2)$$

where [x] is the largest integer that does not exceed a real number x. From Equation (1), Equation (3) is obtained as follows.

$$R=[2^{n-N} \cdot Z/(S \cdot Vref)] \quad (3)$$

That is to say, the following equations (4) and (5) hold.

$$P=[Z/(S \cdot Vref/2^n)] \quad (4)$$

$$R=2^{-N} \cdot P \quad (5)$$

The voltage Z is converted into a digital value P of n bits using the reference voltage S·Vref and the digital value P is right-shifted N bits, whereby the digital value R representing a result of the quantization can be obtained.

As described above, in accordance with the present invention, analog processing technology is employed in the two-dimensional DCT processing and part of the quantization processing for the realization of compact, low-power, and low-cost image encoding apparatus. Additionally, it is arranged such that series of voltage signals applied from the image sensing element are passed to none of the ADC and the image memory but are directly processed in the two-dimensional analog DCT circuit, and the result of the two-dimensional DCT is further processed in the quantization circuit. Such arrangement makes it easy to integrate the image sensing element, the two-dimensional analog DCT and the quantization circuit on a single chip.

BRIEF DESCRIPTION OF THE DRAWINGS

FIG. 3 details a sum-of-products arithmetic operation that is performed in a two-dimensional analog DCT circuit of FIG. 2.

DETAILED DESCRIPTION OF THE INVENTION

Figure 1:
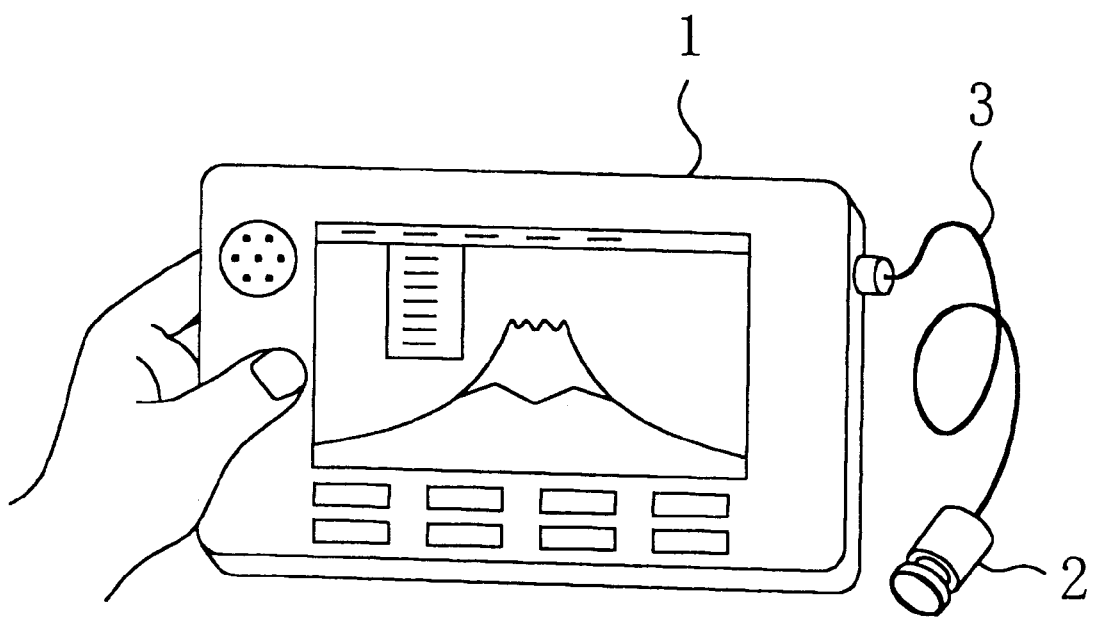
FIG. 1 is a perspective view showing an appearance of a mobile multimedia computer with a camera head containing therein a one-chip image encoding apparatus according to the present invention.

FIG. 1 shows a mobile multimedia computer. This computer has a computer section 1, a camera head 2 containing therein a one-chip image encoding apparatus in accordance with the present invention, a cable 3 for establishing connection between the computer section 1 and the camera head 2.

Figure 2:
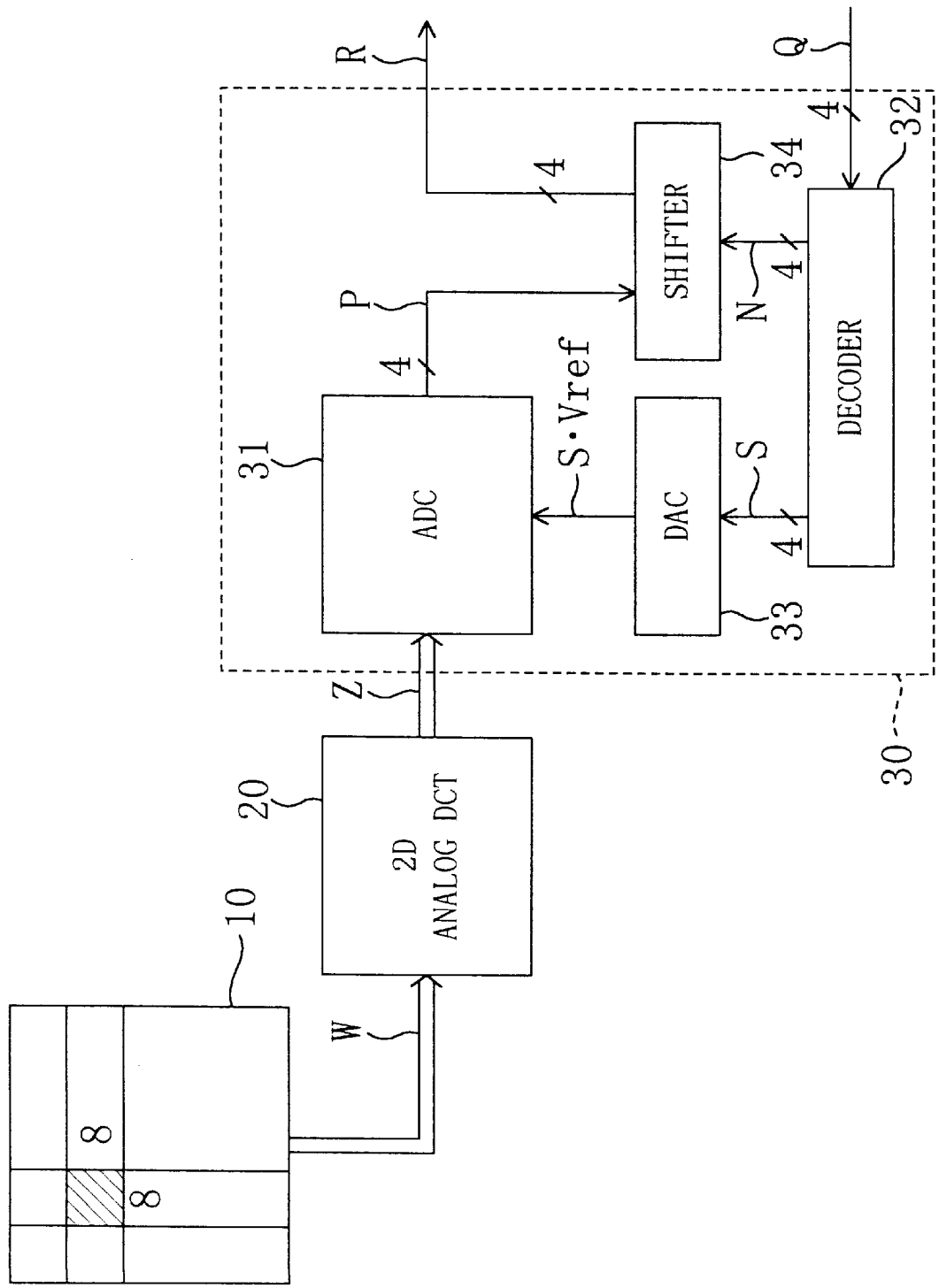
FIG. 2 outlines in block form a one-chip image encoding apparatus in accordance with one embodiment of the present invention.

FIG. 2 outlines the one-chip image encoding apparatus which is contained in the camera head 2. This apparatus is formed by integration of an image sensing element 10, a two-dimensional analog DCT circuit 20, and a quantization circuit 30 on a single semiconductor chip.

The image sensing element 10 is formed by, for example, a CMOS image sensor and provides a series of voltage signals W to the two-dimensional analog DCT circuit 20 in which one block of 8×8 pixels of an entire two-dimensional image forms a unit. If i and j take a value ranging from 0 to 7, then 8×8 voltage signals h(i,j) are applied as the voltage signal series W to the two-dimensional analog DCT circuit 20. At this time, eight voltage signals h(0,j) to h(7,j) are supplied as voltage signals W0 to W7 of Group j in parallel with one another. The two-dimensional analog DCT circuit 20 performs a two-dimensional DCT on the voltage signal series W.

Here, the two-dimensional DCT is described. The two-dimensional DCT of the 8×8 voltage signals h(i, j) can be given by:

$$H(u,v)=\{C(u)C(v)/16\}\times\Sigma i=0^7\Sigma j=0^7 h(i,j)\cos\{(2i+1)u\pi/16\}\cos\{(2j+1)v\pi/16\} \quad (6)$$

where u and v take a value ranging from 0 to 7. C(0) is equal to $2^{-1/2}$. If u≠0, then C(u)=1. If v≠0, then C(v)=1. Here, Hj(u) is given by:

$$Hj(u)=\{C(u)/4\}\Sigma i=0^7 h(i,j)\cos\{(2i+1)u\pi/16\} \quad (7)$$

where j and u take a value ranging from 0 to 7. Equation (6) is changed to:

$$H(u,v)=\{C(v)/4\}\Sigma j=0^7 Hj(u)\cos\{(2j+1)v\pi/16\} \quad (8)$$

A two-dimensional DCT can be implemented by finding Hj(u) by multiplications of h(0,J) to h(7,J) by respective coefficients and by summing the products according to Equation (7), and by performing the same arithmetic operations on H0(u) to H7(u). If a=cos(π/16)=0.9808, b=cos(π/8)=0.9239, c=cos(3 π/16)=0.8315, d=cos(π/4)=0.7071, e=cos(5π/16)=0. 5556, f=cos(3π/8)=0.3827, and g=cos(7π/16)=0.1951, this makes it possible to express Equation (7) as shown in FIG. 3.

Referring to FIG. 2, when u and v each take a value ranging from 0 to 7, 8×8 voltage signals H(u,v) are applied as a series of voltage signals Z to the quantization circuit 30. At this time, eight voltage signals H(0,v) to H(7,v) are supplied in parallel with one another as voltage signals Z0 to Z7 of Group v. The quantization circuit 30 provides the digital values R representing quantization results of voltages of the voltage signal series Z.

The quantization circuit 30 has an ADC circuit 31, a decoder 32, a DAC 33, and a shifter 34. The ADC circuit 31 is disposed to convert the voltage signal series Z representing a transform result of the two-dimensional analog DCT circuit 20 into digital values P each of which consists of four bits. The decoder 32 is disposed to generate from the quantization coefficient Q of four bits a shift amount control signal N of four bits and a reference voltage control signal S of four bits, the signals N and S satisfying $Q=2^N \cdot S$ (1≦S<2). The DAC 33 is disposed to provide the reference voltage S·Vref (Vref=fixed voltage) corresponding to the reference voltage control signal S to the ADC circuit 31. The shifter 34 is disposed to perform a process of right-shifting a digital value P from the ADC circuit 31 N bits corresponding to the shift amount control signal N, to obtain an output digital value R of four bits. In the quantization circuit 30 the signals N and S which satisfy Equation (1) are generated from the quantization coefficient Q, the voltage signal series Z is converted into the digital values P using the reference voltage S·Vref according to Equation (4), and a process of right-shifting the digital values P N bits is carried out according to Equation (5), for obtaining the output digital values R representing quantization results.

The one-chip image encoding apparatus, shown in FIG. 2, is provided with external devices, namely a variable length encoder and a data buffer for use in rate control. The variable length encoder receives the digital value R from the shifter 34. The data buffer outputs encoded data received from the variable length encoder and provides the quantization coefficient Q to the decoder 32. At this time, the rate control of encoding is achieved by a change in the quantization coefficient Q.

The two-dimensional analog DCT circuit 20, the ADC circuit 31, the decoder 32, and the shifter 34 are described.

Figure 4:
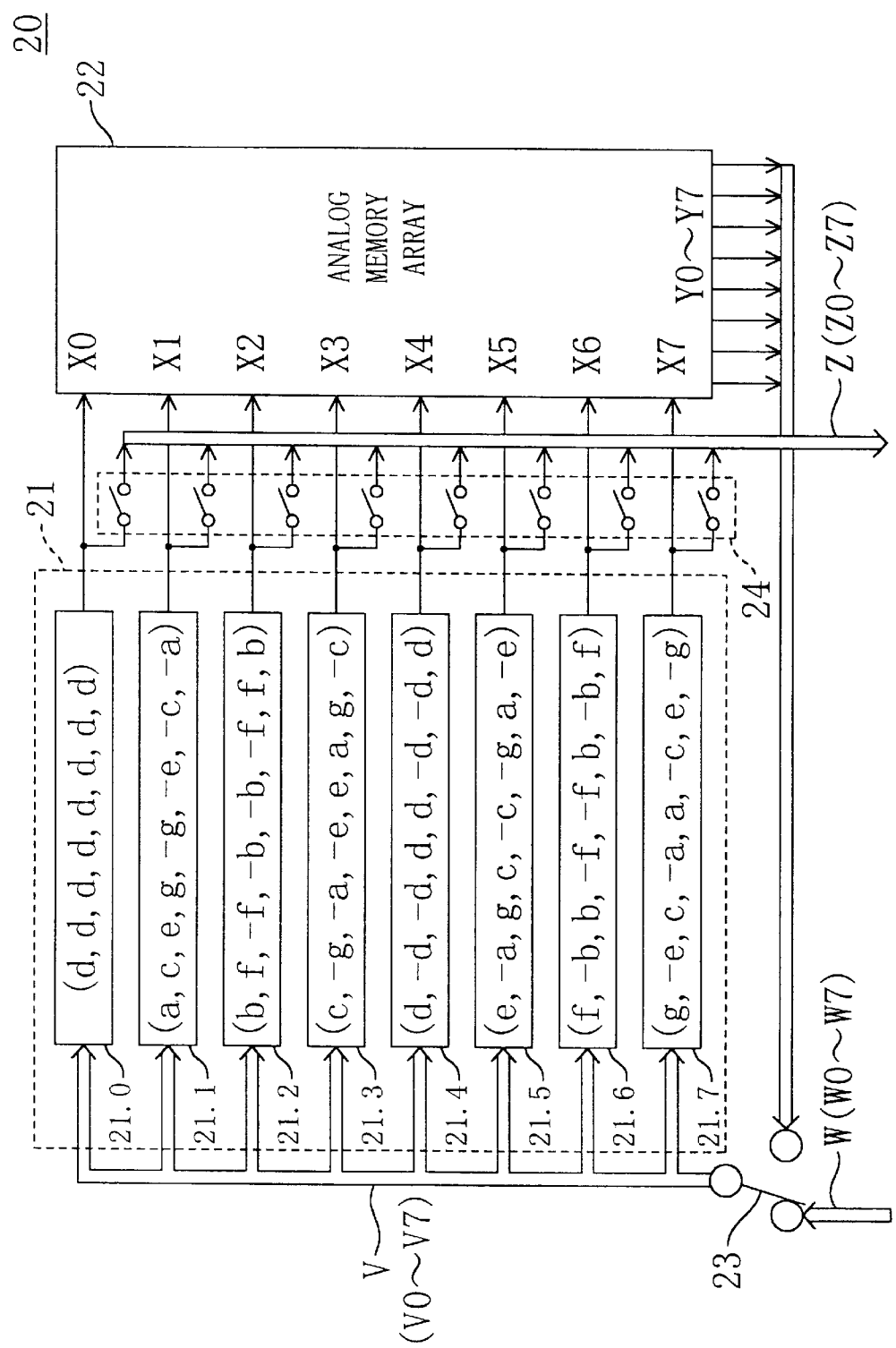
FIG. 4 shows in block form the internal organization of the two-dimensional analog DCT circuit of FIG. 2.

Referring now to FIG. 4, the internal organization of the two-dimensional analog DCT circuit 20 of FIG. 2 is illustrated. The circuit 20 of FIG. 4 has a row of analog sum-of-products arithmetic units 21 for performing one-dimensional DCT and an analog memory array 22 for performing matrix transposition. The analog memory array 22 holds a series of output voltage signals X of the analog sum-of-products arithmetic unit row 21 corresponding to a series of voltage signals W from the image sensing element 10 and provides a series of voltage signals Y, obtained by transposing a matrix formed of the output voltage signal series X, to the analog sum-of-products arithmetic unit row 21. A switch 23, shown in FIG. 4, is disposed to select between the voltage signal series W from the image sensing element 10 and the voltage signal series Y from the analog memory array 22 and to provide W or Y, whichever is selected, as a series of input signals V to the analog sum-of-products arithmetic unit row 21. The analog sum-of-products arithmetic unit row 21 is formed of eight analog sum-of-products arithmetic units 21.0 to 21.7 so as to calculate Equation (7), that is, the matrix arithmetic operations of FIG. 3. The output voltage signal series Z of the analog sum-of-products arithmetic unit row 21 corresponding to the voltage signal series Y from the analog memory array 22 is passed via a row of switches 24 to the quantization circuit 30.

Figure 5:
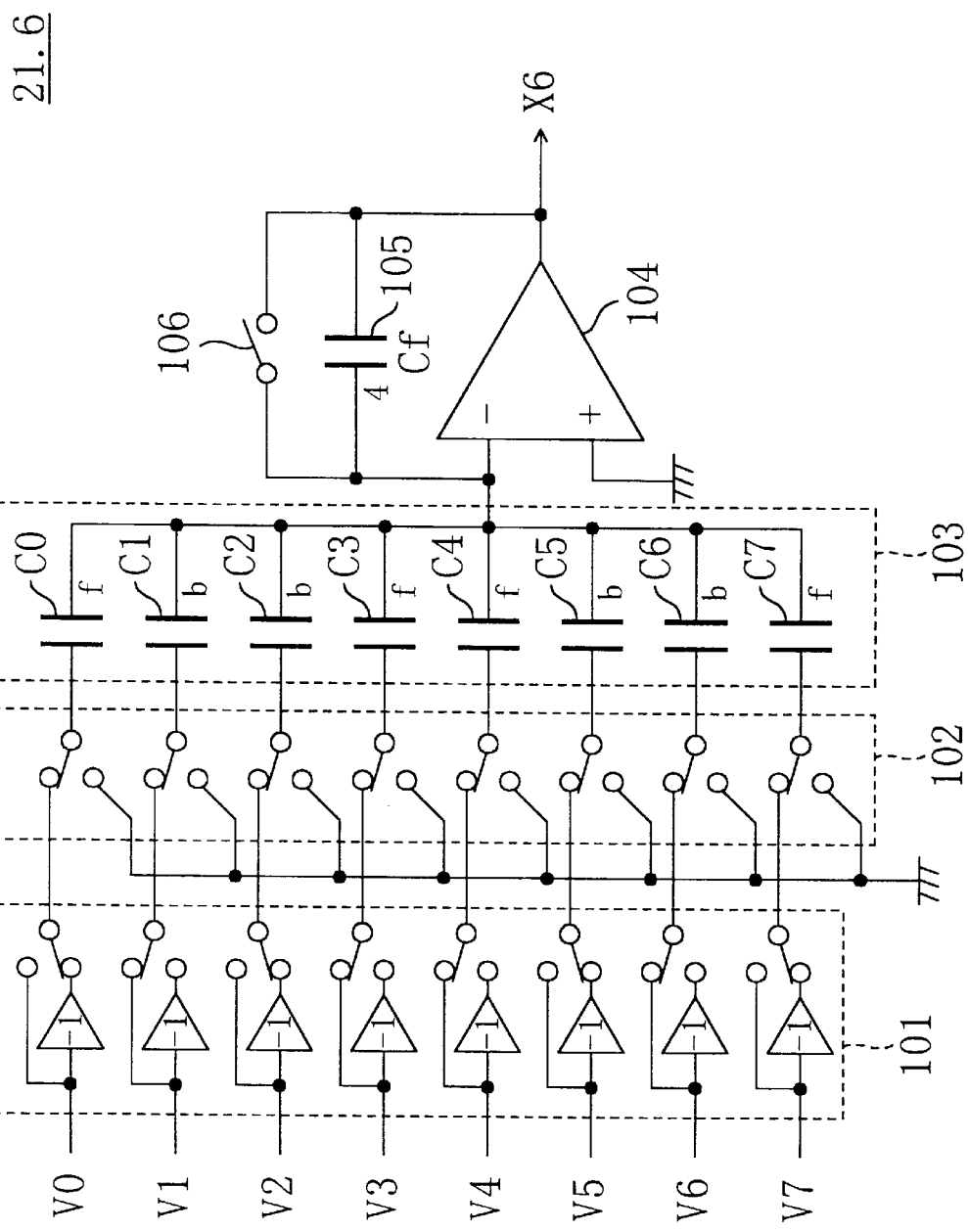
FIG. 5 is a circuit diagram showing the internal organization of one analog sum-of-products arithmetic unit of FIG. 4.

FIG. 5 shows the internal organization of the analog sum-of-products arithmetic unit 21.6 of FIG. 4. The arithmetic unit 21.6 of FIG. 5 has a row of polarity change switches 101, a row of input switches 102, a row of capacitors 103, an operational amplifier 104, a feedback capacitor 105, and an equalizing switch 106. Suppose here that the switch 23 of FIG. 4 now establishes connection to the image sensing element 10. In other words, V0=h(0,j), V1=h(1,j), V2=h(2,j), V3=h(3,j), V4=h(4,j), V5=h(5,j), V6=h(6,j), and V7=h(7,j). The polarity change switch row 101 is provided with inverting amplifiers for inverting V0, V2, V5, and V7 of the eight voltage signals (V0 to V7). The capacitor row 103 is formed of eight capacitors having respective values C0, C1, C2, C3, C4, C5, C6, and C7 which are weighted respectively f, b, b, f, f, b, b, and f, and the value of the feedback capacitor 105, Cf, is weighed 4. In the analog sum-of-products arithmetic unit 21.6, the equalizing switch 106 is closed, the input switch row 102 forms connection to the signals, and the voltage signals V0 to V7 are applied to the capacitor row 103. Thereafter, the equalizing switch 106 is released, and when the input switch row 102 forms connection to the ground a desired voltage signal X6 (=Hj(6)) is obtained from the operational amplifier 104 constructing an addition operation circuit.

Figure 6:
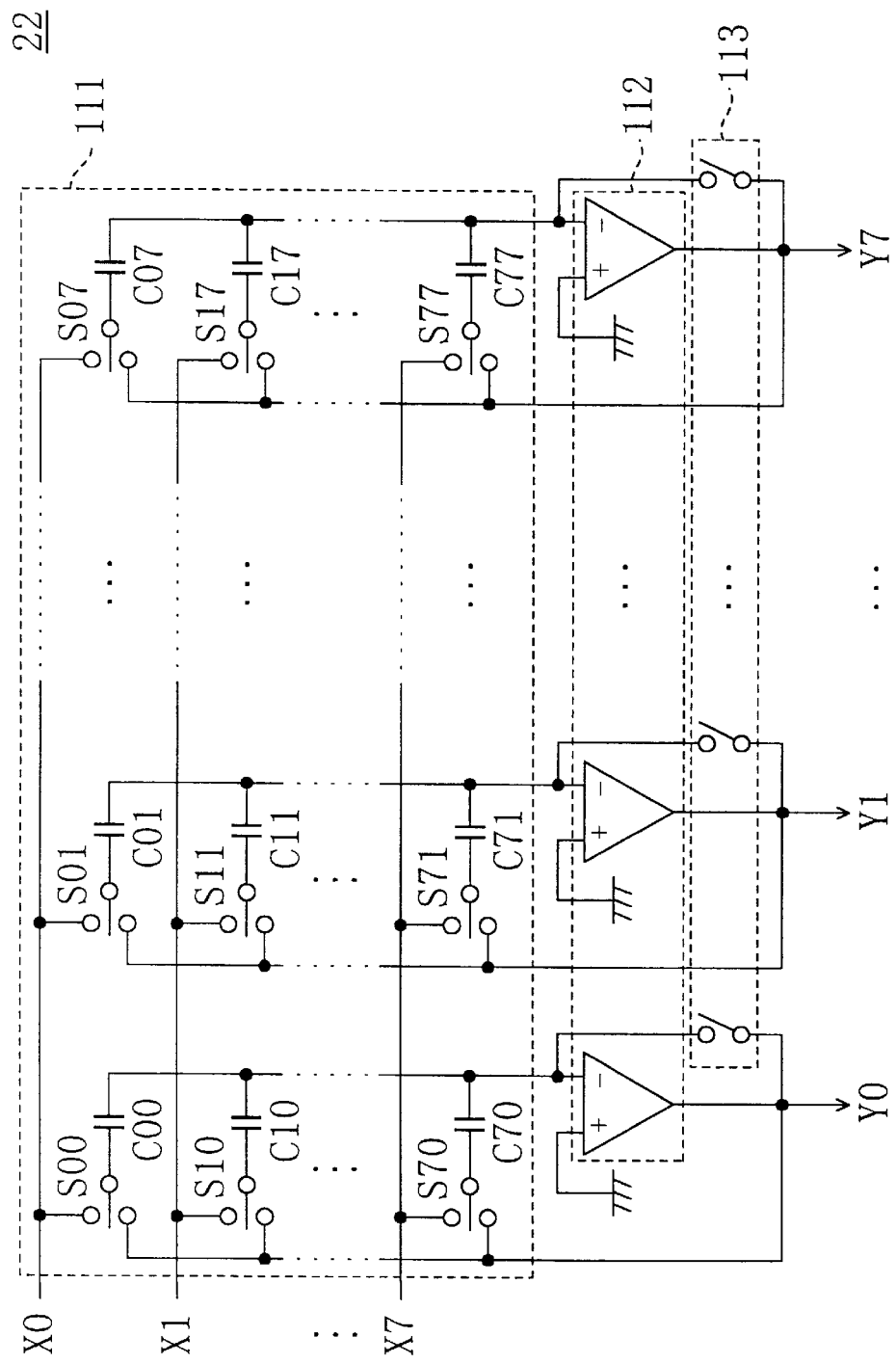
FIG. 6 is a circuit diagram showing the internal organization of an analog memory array of FIG. 4.

Referring now to FIG. 6, the internal organization of the analog memory array 22 of FIG. 4 is illustrated. Shown in FIG. 6 are a row of switches/capacitors 111, a row of operational amplifiers 112, and a row of feedback switches 113. The switch/capacitor row 111 is formed of 8×8 (=64) switches S00 to S77 and 8×8 (=64) capacitors C00 to C77. In the analog memory array 22 the feedback switch row 113 is closed during the write operation. By switching of the switch/capacitor row 111, voltage signals X0, X1, . . . , and X7 of Group 1 are stored in the eight capacitors C00, C10, . . . , and C70, respectively, voltage signals X0, X1, . . . , and X7 of Group 2 are stored in the eight capacitors C01, C211, . . . , and C71, respectively and so on. Finally, voltage signals X0, X1, . . . , and X7 of Group 8 are stored in the eight capacitors C07, C17, . . . , and C77, respectively. During the read operation, the feedback switch row 113 is released. Voltages, held in the eight capacitors C00, C01, . . . , and C07, are read out as voltage signals Y0, Y1, . . . , and Y7 of Group 1 by the operational amplifier row 112, voltages, held in the eight capacitors C10, C11, . . . , and C17, are read out as voltage signals Y0, Y1, . . . , and Y7 of Group 2 and so on. Finally, voltages, held in the eight capacitors C70, C71, . . . , and C77 are read out as voltage signals Y0, Y1, . . . , and Y7 of Group 8. In this way, a matrix transposition relating to the voltage signal series is implemented.

Figure 7:
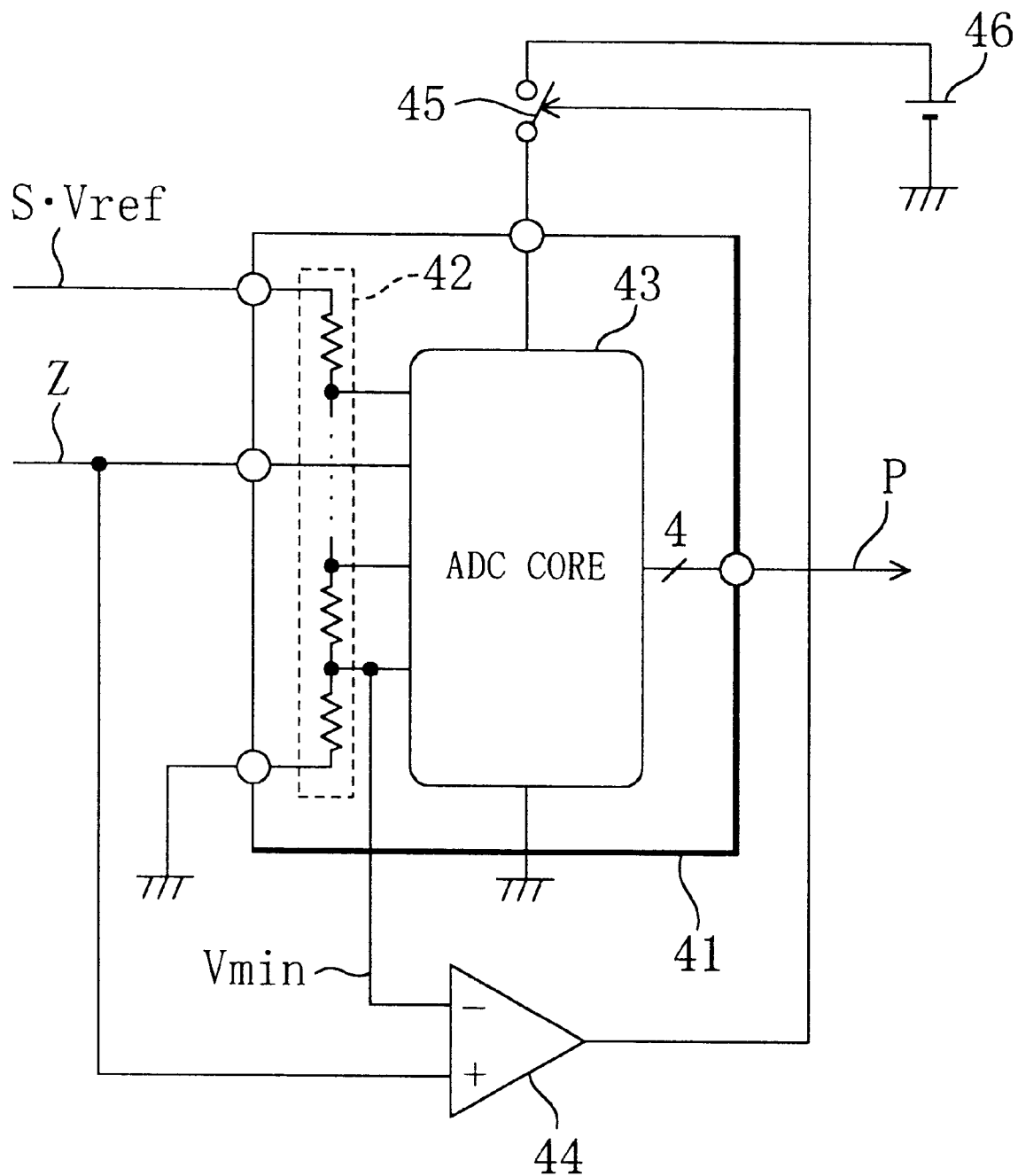
FIG. 7 is a circuit diagram showing a part of the internal organization of an ADC circuit of FIG. 2.

FIG. 7 shows a part of the internal organization of the ADC circuit 31 of FIG. 2. An ADC 41, which is a major unit of the ADC circuit 31, has a row of resistors 42 disposed to divide the reference voltage S,Vref to generate a plurality of internal reference voltages, and an ADC core 43. The circuit of FIG. 7 further includes a comparator 44 disposed to make a comparison between Z (the input voltage) and Vmin (the minimum reference voltage of the internal reference voltages corresponding to a 1LSB) and a switch 45 coupled to an output of the comparator 44 and connected between the ADC core 43 and a power supply 46 so as to control the supply of power to the ADC core 43. In order to hold the power consumption low, it is arranged such that the ADC core 43 stops operating when Z≦Vmin.

Concrete examples of the quantization coefficient Q (Q=$2^N$·S(1≦S<2)), the shift amount control signal N, and the reference voltage control signal S are described. Q and S are expressed in binary notation. N is expressed in decimal notation.

(1) If Q = 0001, then N = 0 and S = 1. 000
(2) If Q = 0010, then N = 1 and S = 1. 000
    If Q = 0011, then N = 1 and S = 1. 100
(3) If Q = 0100, then N = 2 and S = 1. 000
    If Q = 0101, then N = 2 and S = 1. 010
    If Q = 0110, then N = 2 and S = 1. 100
    If Q = 0111, then N = 2 and S = 1. 110
(4) If Q = 1000, then N = 3 and S = 1. 000
    If Q = 1001, then N = 3 and S = 1. 001
    If Q = 1010, then N = 3 and S = 1. 010
    If Q = 1011, then N = 3 and S = 1. 011
    If Q = 1100, then N = 3 and S = 1. 100
    If Q = 1101, then N = 3 and S = 1. 101
    If Q = 1110, then N = 3 and S = 1. 110
    If Q = 1111, then N = 3 and S = 1. 111

Figure 8:
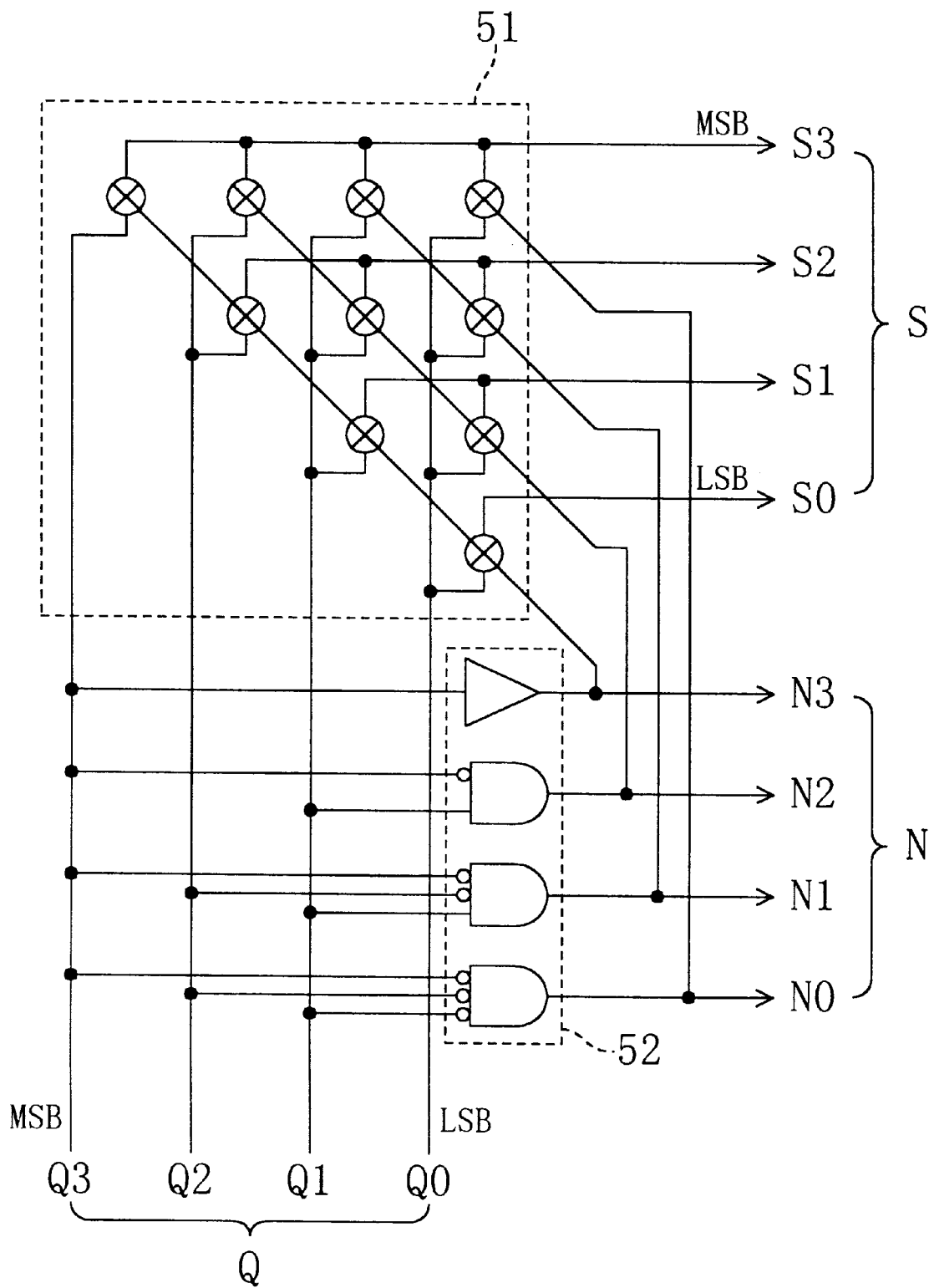
FIG. 8 is a circuit diagram showing the internal organization of a decoder of FIG. 2.

FIG. 8 shows the internal organization of the decoder 32 of FIG. 2. The decoder 32 of FIG. 8 has a group of switches 51 and a row of logical circuits 52. The logical circuit row 52 generates four bits N3, N2, N1, and N0 together forming the shift amount control signal N from four bits Q3, Q2, Q1, and Q0 together forming the quantization coefficient Q. N0=1, N1=1, N2=1, and N3=1 mean N=0, N=1, N=2, and N=3, respectively. According to the shift amount control signal N, the switch group 51 generates four bits S3, S2, S1, and S0 together forming the reference voltage control signal S from Q3, Q2, Q1, and Q0. For instance, if Q=0101, N2=1 is obtained in the logical circuit row 52 and S=1. 010 is obtained by a process of left-shifting Q one bit in the switch group 51. Referring to the fixed voltage Vref, the DAC 33 of FIG. 2 converts the reference voltage control signal S into an analog signal, to provide the variable reference voltage S·Vref to the ADC circuit 31.

Figure 9:
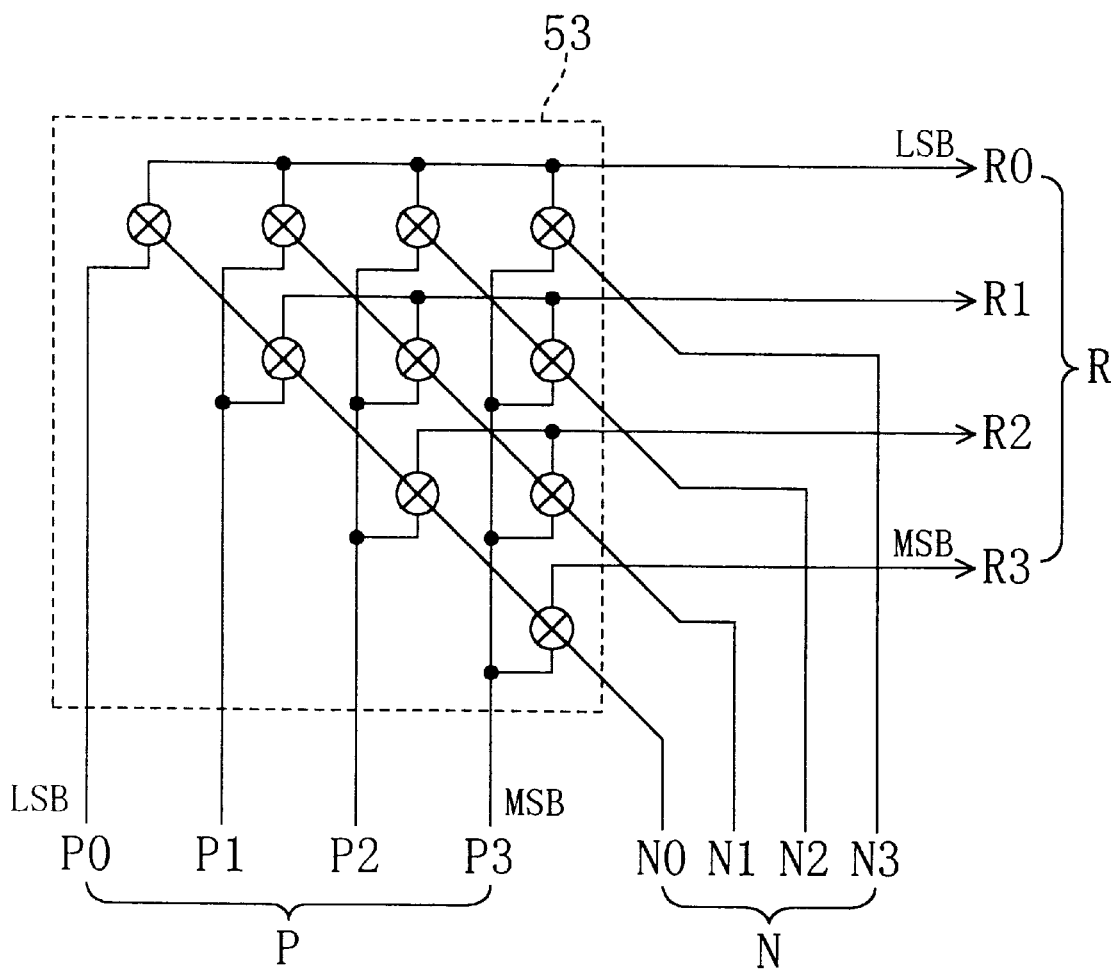
FIG. 9 is a circuit diagram showing the internal organization of a shifter of FIG. 2.

FIG. 9 shows the internal organization of the shifter 34 of FIG. 2. The sifter 34 of FIG. 9 is formed of a group of switches 53. According to the shift amount control signal N, the switch group 53 generates four bits R3, R2, R1, and R0 together forming the output digital value R of the quantization circuit 30 from four bits P3, P2, P1, and P0 together forming the output digital value P of the ADC circuit 31. For example, if P=0100 and N2=1, R=0001 is obtained by a process of right-shifting P two bits in the switch group 53.

As described above, in accordance with the embodiment of FIG. 2, analog processing is employed in the two-dimensional DCT and part of the quantization for the realization of compact, low-power, and low-cost image encoding apparatus. Series of voltage signals applied from the image sensing element 10 are passed to none of the ADC and the image memory but are directly processed in the two-dimensional analog DCT circuit 20, which makes it easy to integrate the image sensing element 10, the two-dimensional analog DCT circuit 20, and the quantization circuit 30 on a single chip. In order to stop the ADC 41 when in the quantization circuit 30 the input voltage Z of the ADC 41 is detected to fall below the predetermined voltage Vmin, power control means 44 and 45 are provided. This achieves a considerable reduction of the power consumption thereby providing an image encoding apparatus suitable for, for example, mobile videotelephones and mobile computers.

Figure 10:
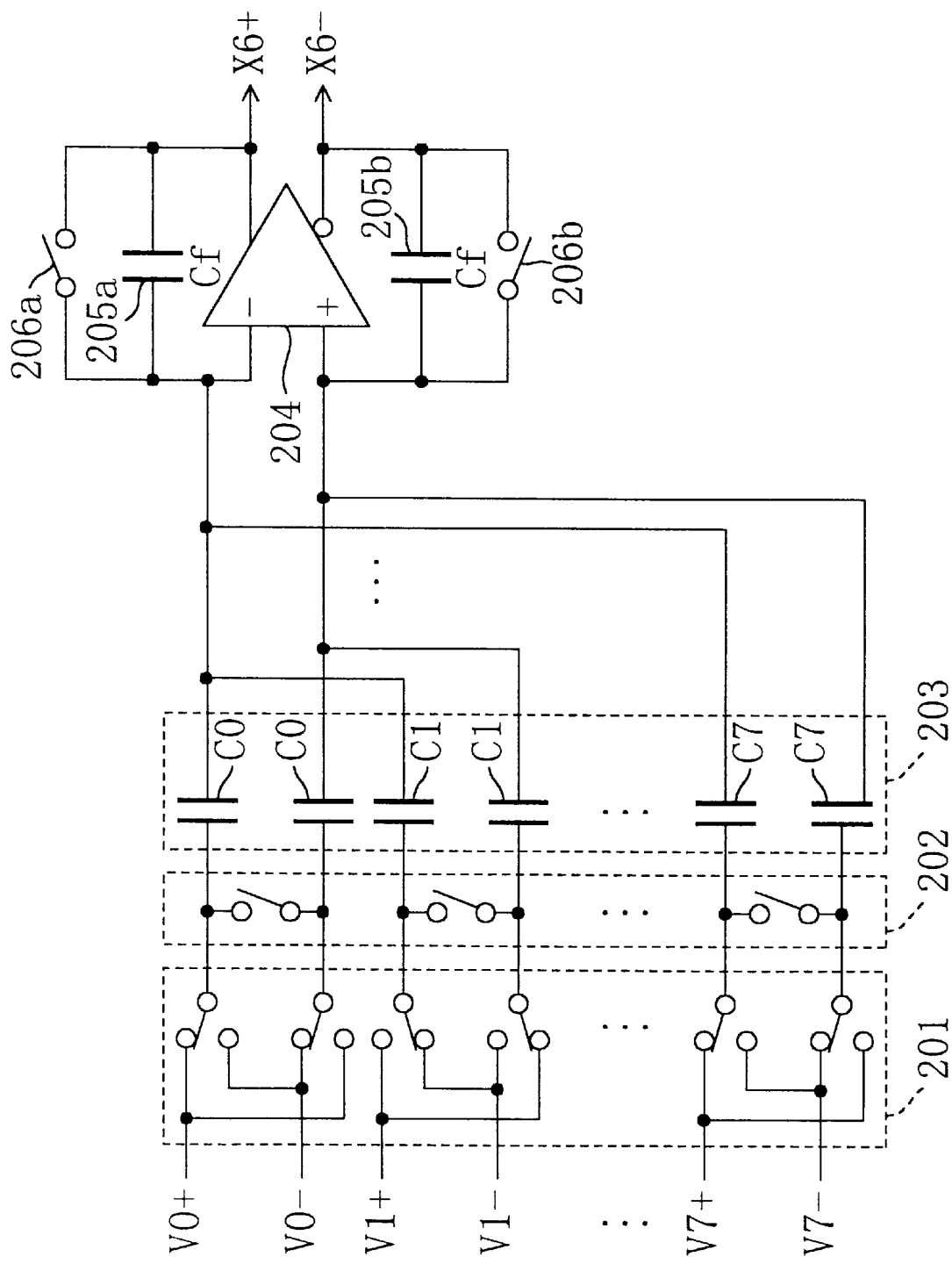
FIG. 10 is a circuit diagram showing a modification of the analog sum-of-products arithmetic unit.

In the foregoing description, the circuit organization is a single signal form; however, it may be a differential circuit form. FIG. 10 shows a modification example in differential input/output form of the analog sum-of-products arithmetic unit 21.6 in single signal form shown in FIG. 5. Shown in FIG. 10 are a row of polarity change switches 201, a row of input equalizing switches 202, a row of capacitors 203, an operational amplifier 204, feedback capacitors 205a and 205b, and output equalizing switches 206a and 206b. In accordance with the analog sum-of-products arithmetic unit of FIG. 10, it is unnecessary for the polarity change switch row 201 to have inverting amplifiers.

It may be arranged such that two two-dimensional analog DCT circuits are disposed between the image sensing element 10 and the quantization circuit 30, and while one of the two two-dimensional analog DCT circuits supplies the voltage signal series Z to the quantization circuit 30 the other two-dimensional analog DCT circuit receives the voltage signal series W from the image sensing element 10. These two two-dimensional analog DCT circuits provide in alternating manner the voltage signal series Z to the quantization circuit 30. This accordingly allows the quantization circuit 30 to continuously operate.

The number of bits forming the digital value P or the digital value R may be an arbitrary number. Likewise, the number of bits forming the quantization coefficient Q, the shift amount control signal N, or the reference voltage control signal S may be an arbitrary number.

What is claimed is:

1. An image encoding apparatus comprising:
   an image sensing element for providing a series of voltage signals corresponding to a two-dimensional image;
   a two-dimensional analog discrete cosine transform circuit for performing, in pixel blocks, a two-dimensional discrete cosine transform on said series of voltage signals supplied from said image sensing element; and
   a quantization circuit for converting a voltage representing a result of said two-dimensional discrete cosine transform carried out by said two-dimensional analog discrete cosine transform circuit into a digital value according to a given quantization coefficient $Q=2^N \cdot S$ ($1 \leq S < 2$) wherein a voltage $S \cdot Vref$ that is $S$ times greater than a fixed voltage $Vref$ serves as a reference voltage, and for right-shifting said digital value N bits in order to quantize said two-dimensional discrete cosine transform result, N being greater than or equal to zero,
   said two-dimensional analog discrete cosine transform circuit comprising:
   a row of analog sum-of products arithmetic units for performing a one dimensional discrete cosine transform; and
   an analog memory array for holding a series of output voltage signals of said row of analog sum-of-products arithmetic units corresponding to said series of voltage signals from said image sensing element, and for providing a series of voltage signals obtained by transposing a matrix formed of said series of output voltage signals to said row of analog sum-of-products arithmetic units,
   each of said analog sum-of-products arithmetic units comprising:
   a plurality of capacitors having respective weights for corresponding elements of a one-dimensional discrete cosine transform matrix;
   a row of switches for providing an input voltage signal to each of said capacitors; and;
   an addition operation circuit for summing voltages held in said plurality of capacitors.

2. The image encoding apparatus of claim 1 wherein each of said analog sum-of-products arithmetic units is formed by an arithmetic unit in a single signal form and further includes a plurality of inverting amplifiers for making a change in the polarity of said input voltage signal.

3. The image encoding apparatus of claim 1 wherein each of said analog sum-of-products arithmetic units is formed by an arithmetic unit in a differential input/output form and said row of switches has the function of making a change in the polarity of said input voltage signal.

4. The image encoding apparatus of claim 1 wherein said analog memory array includes a row of switches/capacitors arranged in a matrix form.

5. The image encoding apparatus of claim 1,
   said quantization circuit including:
   an analog-to-digital conversion circuit for converting a voltage representing a transform result of said two-dimensional analog discrete cosine transform circuit into a digital value;
   a decoder for generating signals N and S which satisfy $Q=2^N \cdot S$ ($1 \leq S < 2$) from a given quantization coefficient Q;
   a digital-to-analog converter for providing, by making reference to said fixed voltage Vref, said reference voltage $S \cdot Vref$ corresponding to said signal S generated by said decoder, to said analog-to-digital conversion circuit; and
   a shifter for right-shifting said digital value produced by said analog-to-digital conversion circuit N bits according to said signal N generated by said decoder.

6. The image encoding apparatus of claim 5,
   said analog-to-digital conversion circuit including:
   an analog-to-digital converter for converting a voltage representing a transform result of said two-dimensional analog discrete cosine transform circuit into a digital value; and
   power control means for controlling said analog-to-digital converter to stop operating when an input voltage to said analog-to-digital converter is detected to fall below a predetermined voltage.

7. The image encoding apparatus of claim 6,
   said power control means including:
   a comparator for making a comparison between an input voltage to said analog-to-digital converter and the minimum reference voltage of a plurality of internal reference voltages obtained by division of said reference voltage $S \cdot Vref$ supplied from said digital-to-analog converter; and
   a switch which is coupled to an output of said comparator in order to control the supply of power to said analog-to-digital converter.

8. A quantization circuit comprising:
   an analog-to-digital conversion circuit for converting an input voltage into a digital value:
   a decoder for generating signals N and S which satisfy $Q=2^N \cdot S$ ($1 \leq S < 2$) from a given quantization coefficient Q, N being greater than or equal to zero;
   a digital-to-analog converter for providing, by making reference to a fixed voltage Vref, a reference voltage $S \cdot Vref$ corresponding to said signal S generated by said decoder, to said analog-to-digital conversion circuit; and
   a shifter for right-shifting said digital value produced by said analog-to-digital conversion circuit N bits according to said signal N generated by said decoder.

9. The quantization circuit of claim 8, said analog-to-digital conversion circuit including:

an analog-to-digital converter for converting a voltage representing a transform result of said two-dimensional analog discrete cosine transform circuit into a digital value; and power control means for controlling said analog-to-digital converter to stop operating when an input voltage to said analog-to-digital converter is detected to fall below a predetermined voltage.

10. The quantization circuit of claim 9, said power control means including:

a comparator for making a comparison between an input voltage to said analog-to-digital converter and the minimum reference voltage of a plurality of internal reference voltages obtained by division of said reference voltage S·Vref supplied from said digital-to-analog converter; and a switch which is coupled to an output of said comparator in order to control the supply of power to said analog-to-digital converter.

* * * * *